(12) United States Patent
Steger et al.

(10) Patent No.: US 9,408,031 B1
(45) Date of Patent: Aug. 2, 2016

(54) GEO-FENCE SPLITTING

(71) Applicant: Skyhook Wireless, Inc., Boston, MA (US)

(72) Inventors: Christopher Steger, Boston, MA (US); Thomas Jason Dytko, Portland, OR (US); Nicolas Brachet, Newton, MA (US); Russel Kipp Jones, Medfield, MA (US); Andrei Dancus, Burlington, MA (US); Andrew Broadstone, Watertown, MA (US); Farshid Alizadeh-Shabdiz, Wayland, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

(21) Appl. No.: 14/593,619

(22) Filed: Jan. 9, 2015

Related U.S. Application Data

(60) Provisional application No. 61/925,437, filed on Jan. 9, 2014.

(51) Int. Cl.
*H04W 4/02* (2009.01)

(52) U.S. Cl.
CPC ..................................... *H04W 4/021* (2013.01)

(58) Field of Classification Search
CPC .............................. H04W 4/021; H04W 4/022
See application file for complete search history.

(56) References Cited

U.S. PATENT DOCUMENTS

| | | | |
|---|---|---|---|
| 8,531,293 B2 | 9/2013 | Putz | |
| 8,755,824 B1 | 6/2014 | Wang et al. | |
| 8,798,646 B1 | 8/2014 | Wang et al. | |
| 2009/0164118 A1 | 6/2009 | Breen | |
| 2011/0136468 A1 | 6/2011 | McNamara | |
| 2012/0077536 A1 | 3/2012 | Goel | |
| 2013/0045760 A1 | 2/2013 | Obermeyer et al. | |
| 2013/0099977 A1 | 4/2013 | Sheshadri et al. | |
| 2013/0138334 A1 | 5/2013 | Meredith | |
| 2013/0178233 A1 | 7/2013 | McCoy | |
| 2013/0295955 A1 | 11/2013 | Sheshadri et al. | |
| 2013/0310053 A1 | 11/2013 | Srivastava et al. | |
| 2013/0324160 A1 | 12/2013 | Sabatellil | |
| 2014/0045516 A1 | 2/2014 | Turgman | |
| 2014/0057648 A1 | 2/2014 | Lyman et al. | |
| 2014/0066090 A1 | 3/2014 | Henderson | |
| 2014/0171099 A1* | 6/2014 | Sydir ................... | H04W 4/021 455/456.1 |
| 2014/0242947 A1 | 8/2014 | Ali et al. | |
| 2014/0274118 A1 | 9/2014 | Carmel | |
| 2014/0302879 A1 | 10/2014 | Kim | |
| 2014/0351560 A1 | 11/2014 | Lautner | |
| 2014/0370909 A1* | 12/2014 | Natucci, Jr. et al. ................ | H04W 52/0251 455/456.1 |

(Continued)

*Primary Examiner* — Kenneth Lam
(74) *Attorney, Agent, or Firm* — Cesari and McKenna, LLP; James A. Blanchette

(57) ABSTRACT

In one embodiment, techniques approximate use of geo-fences of shapes and/or sizes other than those natively support by a mobile device. Upon receiving an initial geo-fence (e.g., a non-supported geo-fence), the mobile device may generate a group of geo-fences (e.g., a group of supported geo-fences) whose union approximates the initial geo-fence, where the group includes one or more geo-fences. The mobile device may treat the group of supported geo-fence as an equivalent to the non-supported geo-fence. When the mobile device crosses one of the supported geo-fences of the group of supported geo-fences, and does not enter into another supported geo-fence of the group of supported geo-fences, a notification may be sent to an application that utilizes the non-supported geo-fence that the non-supported geo-fence has been triggered.

21 Claims, 9 Drawing Sheets

(56) References Cited

U.S. PATENT DOCUMENTS

| | | | |
|---|---|---|---|
| 2014/0370911 A1* | 12/2014 | Gorgenyi | H04W 52/0251 455/456.1 |
| 2015/0095157 A1 | 4/2015 | McDevitt | |
| 2015/0120455 A1 | 4/2015 | McDevitt | |
| 2015/0141037 A1 | 5/2015 | Saha | |
| 2015/0181549 A1 | 6/2015 | Batada | |

* cited by examiner

GEO-FENCE SPLITTING

RELATED APPLICATIONS

The present application claims priority to U.S. Provisional Patent Application No. 61/925,437, filed on Jan. 9, 2014 by Christopher Steger et al., titled "Active Geo-Fence Management and Geo-Fence Splitting", the contents of which are incorporated by reference herein in their entirety.

BACKGROUND

1. Technical Field

The present disclosure relates generally to location-based services, and more specifically to geo-fences.

2. Background Information

Location-based services are a field of mobile applications that leverage the ability of many mobile devices to determine their current location and perform actions based on that location. Location-based services may involve supplying location-dependent content (e.g., advertisements, weather forecasts, driving directions, traffic updates, or other content) on the mobile device itself, providing location information for the mobile device to other devices (e.g., to enable "buddy" finding, child monitoring, or other services), collecting location-based statistical information (e.g., consumer demographic data, traffic data, or other data), or other types of operations.

Some location-based services utilize geo-fences. A geo-fence is a virtual perimeter that may be established around a real-world geographic area. Crossing a geo-fence may cause a service to be provided, cause a service to be withheld, or trigger some other sort of action, depending on the particular application. However, there are several shortcomings in the present implementation of geo-fences on many mobile devices. Two prominent shortcomings involve limits on the number of geo-fences that a mobile device may concurrently monitor, and restrictions on the shape and/or size of geo-fences that the mobile device may monitor.

In order to support geo-fences, mobile devices typically repeatedly determine their current location and compare that location to the virtual perimeter defined by the geo-fence. Such location determination and comparison consumes resources of the mobile device, including processing resources, and, often more importantly, power resources. Given the importance of battery life for many mobile devices, there may be practical limits on how many geo-fences can be concurrently monitored. In some cases, these practical limits are codified into restrictions imposed by the mobile device's operating system or firmware. For example, some mobile devices currently allow concurrent monitoring of about 20 geo-fences for a given application and about 100 geo-fences across all applications. These geo-fence limits are becoming increasingly problematic, as geo-fences are being utilized in more and more location based services. However, increasing these limits has proven difficult, given the compelling desire to even further reduce power consumption of mobile devices.

Further, in order to simplify processing and achieve other efficiencies, some mobile devices impose limits on the possible shapes and sizes of monitored geo-fences. While geo-fences may theoretically be defined to have any of a wide variety of shapes and sizes, some mobile devices only support monitoring of geo-fences having certain supported shapes and sizes. For example, a mobile device may only support circular-shaped geo-fences having a radius of 100 meters. This limitation is becoming increasingly burdensome on developers and users, who may desire to utilize geo-fences having shapes and/or sizes other than those natively supported.

Accordingly, there is a needed for improved techniques that may allow for monitoring of a number of geo-fences beyond a mobile device's geo-fence limit, and for using geo-fences of shapes and/or sizes other than those natively support by the mobile device.

SUMMARY

In one example embodiment, a client on a mobile device approximates use of geo-fences of various shapes and/or sizes, potentially including geo-fences having geometries that are not natively supported on the mobile device. An approximation process (included in the client and/or on the server) receives an initial geo-fence. The initial geo-fence may be a non-supported geo-fence having a shape and/or size that is not natively support by the mobile device. The approximation process generates a group of M geo-fences (e.g., a group of M geo-fences having geometries supported by the device) whose union approximates the initial geo-fence (e.g., supported geo-fence). The group of M geo-fences is mapped to a single identity. If the mobile device is moved to new location proximate to (e.g., has crossed) the union of the M geo-fences (e.g., M supported geo-fences), an application that utilizes the initial geo-fence (e.g., the non-supported geo-fence) is notified. For example, if the mobile device has crossed one of the M geo-fences, and has not crossed into another of the M geo-fences, but has instead left the union of the M geo-fences, an application that utilizes the initial geo-fence (e.g. the non-supported geo-fence) may be notified.

It should be understood that the example embodiments discussed in this Summary may include a variety of other features, including other features discussed below, and variations thereof. This Summary is intended simply as a brief introduction to the reader, and does not imply that those specific features mentioned herein are all the features of the invention, or are necessary, or essential, features of the invention.

BRIEF DESCRIPTION OF THE DRAWINGS

The Detailed Description below refers to the accompanying drawings of example embodiments, of which.

DETAILED DESCRIPTION

Figure 1:
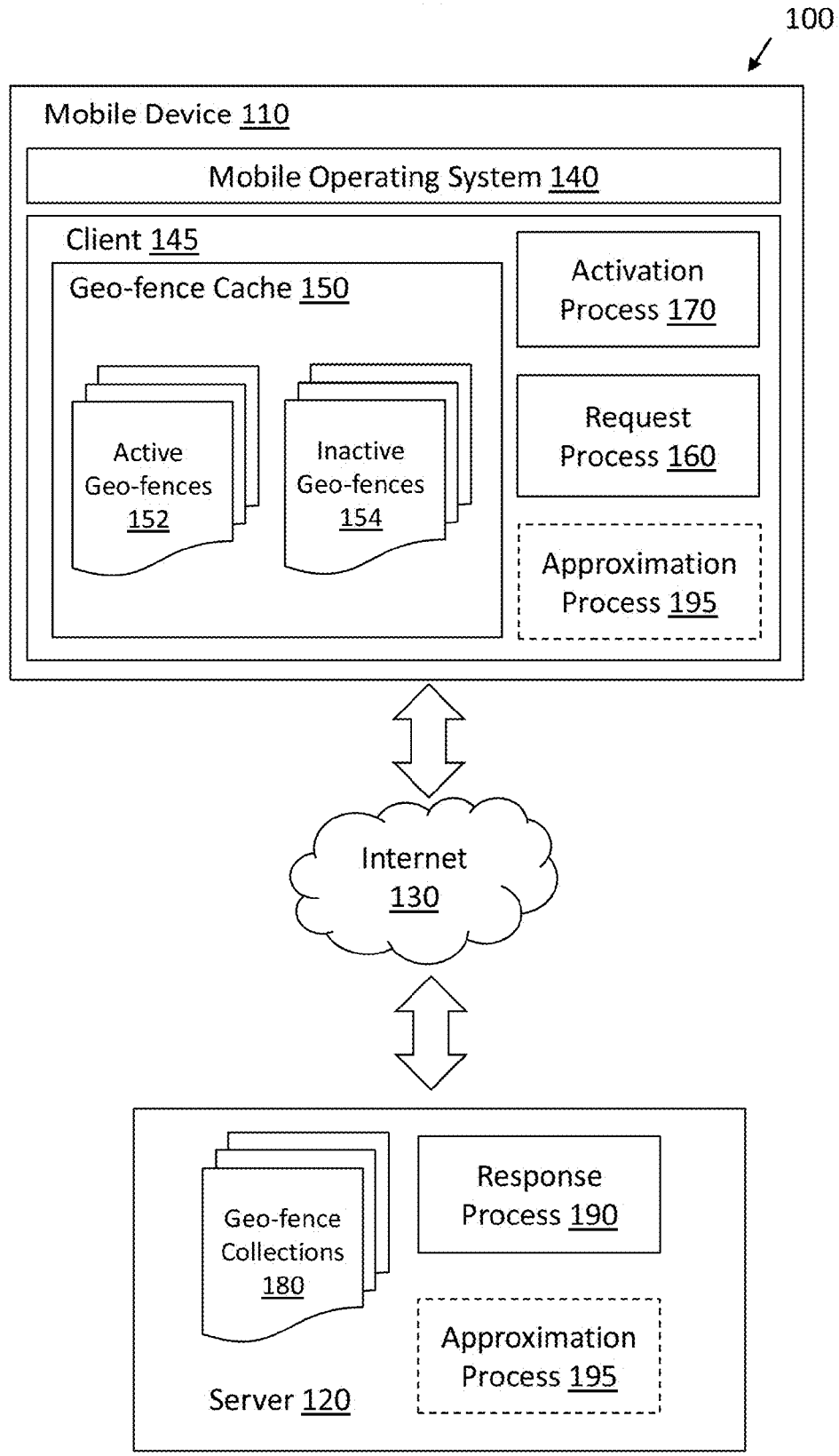
FIG. 1 is a block diagram of an example system that may implement techniques to approximate concurrent monitoring of a large number of geo-fences, and/or to approximate use of geo-fences of various shapes and/or sizes.

FIG. 1 is a block diagram of an example system 100 that may implement techniques to approximate concurrent monitoring of a large number of geo-fences, and/or to approximate use of geo-fences of a variety of shapes and/or sizes. The system includes a mobile device 110 and a server 120, that communicate over a network 130, such as the Internet. As used herein, the term "mobile device" refers to an electronic device designed to be carried on one's person or in a vehicle and having wireless communication capability, such as a smartphone, a tablet computer, an electronic book reader, or other similar device. A mobile device 110 may include a processor coupled to a memory that stores machine-executable instructions, and a network interface (e.g., a cellular, Wi-Fi or other interface) that allows the mobile device to communicate with the network 130. Likewise, the server may include a processor coupled to a memory that stores further machine-executable instructions, and have its own network interface to the network 130.

The machine-executable instructions on the mobile device 110 may include instructions for a mobile operating system 140, for example the iOS® operating system available from Apple Computer Inc., the Android® operating system available from Google Inc., or another operating system that functionally organizes the mobile device. The machine-executable instructions may also include instructions for a client application (or simply a "client") 145 that implements client-side portions of the presently described techniques. The client 145 may include a geo-fence cache 150 that maintains geo-fences, including a number of active geo-fences 152 and a number of in-active geo-fences 154. As discussed in more detail below, a request process 160 of the client 145 may initially load the geo-fence cache 150 with geo-fences, and replenish the geo-fence cache 150 with additional geo-fences, when needed. Further, as discussed in more detail below, an activation process 170 of the client may move geo-fences between the active geo-fences 152 and the inactive geo-fences 154 as needed. Likewise, in some implementations, some or all of an approximation process 195 may be included in the client and operate to approximate use of geo-fences of various shapes and/or sizes.

The machine-executable instructions on the server 120 may include instructions for maintaining one or more collections of geo-fences 180 that store geo-fences used with one- or more location based services. The machine-executable instructions may also include instructions for a response process 190 that may interact with the request process 150 on the mobile device 110, to supply geo-fences from the geo-fence collections 180 on the server 120 to the geo-fence cache 150 on the mobile device 110. In some implementations, some or all of the approximation process 195 may be resident on the server 120.

Figure 2:
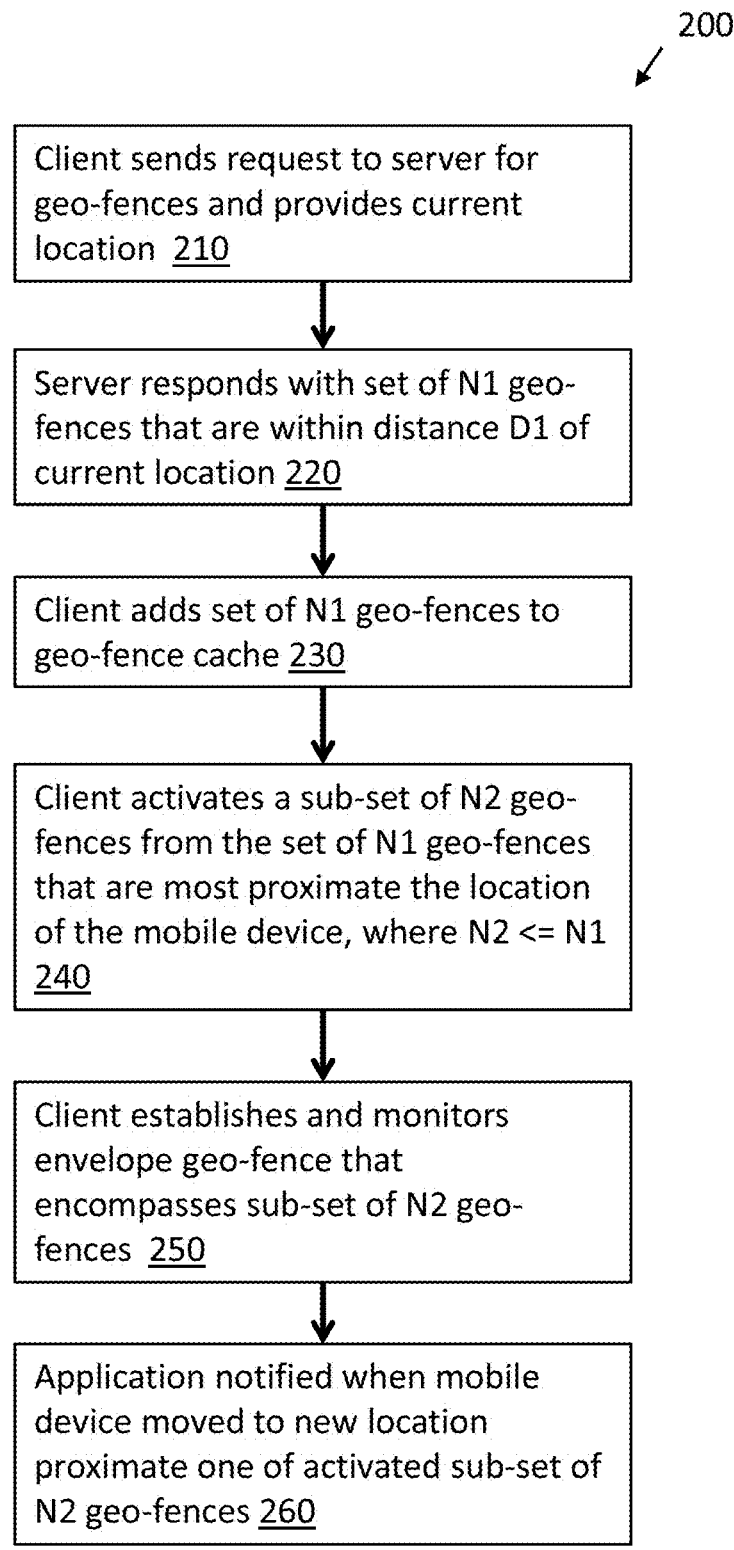
FIG. 2 is a flow diagram of an example sequence of steps for initially obtaining and activating geo-fences, as part of a technique to approximate concurrent monitoring of a large number of geo-fences.
Figure 3:
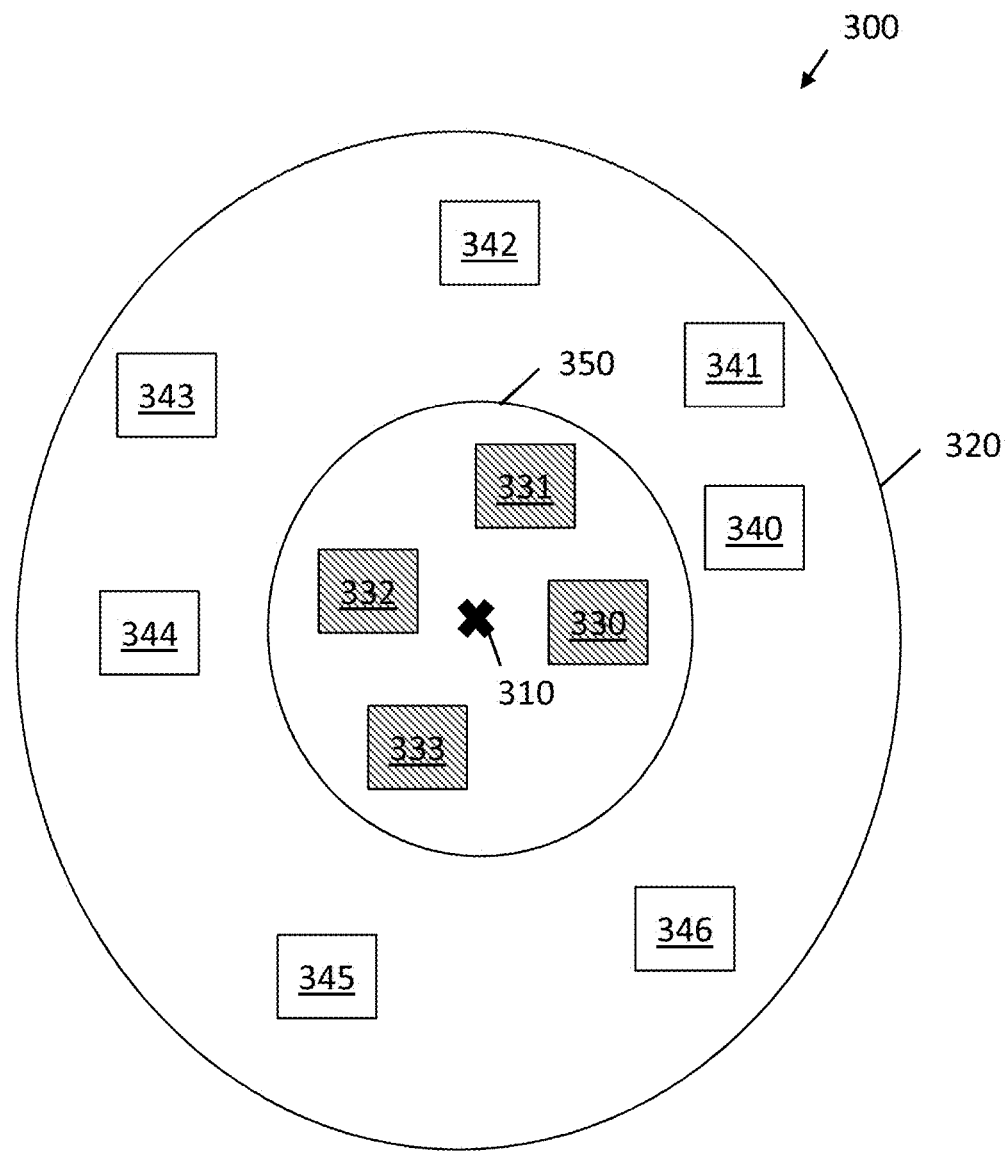
FIG. 3 is an example arrangement of geo-fences illustrating quantities discussed in FIG. 2.

FIG. 2 is a flow diagram of an example sequence of steps 200 for initially obtaining and activating geo-fences, as part of a technique to approximate concurrent monitoring of a large number of geo-fences. FIG. 2 may be better understood by reference also to FIG. 3, which is an example arrangement of geo-fences 300 illustrating quantities discussed in FIG. 2. At step 210 the client 145 sends a request to the server 120 for geo-fences from the one or more collections 180, and provides the mobile device's current location. For example, as shown in FIG. 3, the mobile device may be initially located at a location 310. This location may be learned using any of a variety of location determination systems, including wireless local area network (WLAN)-based systems, global positioning system (GPS)-based systems, hybrid systems, and/or other systems. At step 220, the server 120 responds with the set of N1 geo-fences from that are within a distance D1 of the current location of the mobile device 110, where D1 is a distance value, and N1 is a predetermined value or based on the number of geo-fences that happen to be within distance D1. For example, as shown in FIG. 3, a distance D1 from the location of the mobile device 310 may define a circumference 320 that includes the set of N1 geo-fences represented as geo-fences 330-346. The value of D1 may be predetermined, or dynamically selected.

At step 230, the client 145 adds the set of N1 geo-fences to the geo-fence cache 150 maintained on the mobile device 110. Initially, all the geo-fences in the geo-fence cache 150 may be inactive (i.e., not currently monitored). At step 240, the client 145 activates (i.e. causes to be monitored) a sub-set of N2 geo-fences from the set of N1 geo-fences that are most proximate the location of the mobile device 145, where N2 is generally a number less than or equal to N1 (i.e. N2<=N1). For example, as shown in FIG. 3, an activated sub-set of N2 geo-fences may include the geo-fences 330-333, while geo-fences 340-346 may remain inactive. The value of N2 may be predetermined, or dynamically selected. In one implementation, the value is based on a device-imposed geo-fence limit. Alternatively, the value may be based on some other factor.

At step 250, the client 145 establishes and monitors an "envelope" geo-fence that provides a basis for determining when the activated sub-set of N2 geo-fences may need to be updated to select a new activated sub-set of N2 geo-fences. The envelope geo-fence may contain all of the N2 geo-fences, or it may contain a proximate subset of the N2 geo-fences. When the envelope geo-fence contains all of the N2 geo-fences it will generally encompass the N2 geo-fences. For example, as shown in FIG. 3, an envelope geo-fence 350 may encompass geo-fences 330-333, but exclude geo-fences 340-346. In one implementation, the envelope geo-fence may be arranged as a minimum bounding geo-fence (e.g., a geo-fence whose perimeter forms a minimum bounding circle, minimum bounding polygon or other minimum bounding shape) around the geo-fences of the activated sub-set of N2 geo-fences. The minimum bounding geo-fence may have a pre-determined shape (e.g., always be circular), or its shape may be dynamical dependent upon the geo-fences it bounds (e.g., a shape selected from a set of possible shapes based on which shape will most efficiently enclose the geo-fences). At step 260, the mobile device is moved to a new location proximate one of the activated sub-set of N2 geo-fences (e.g., has crossed one of the geo-fences in the activated sub-set), and an application that utilizes that geo-fence is notified.

Figure 4:
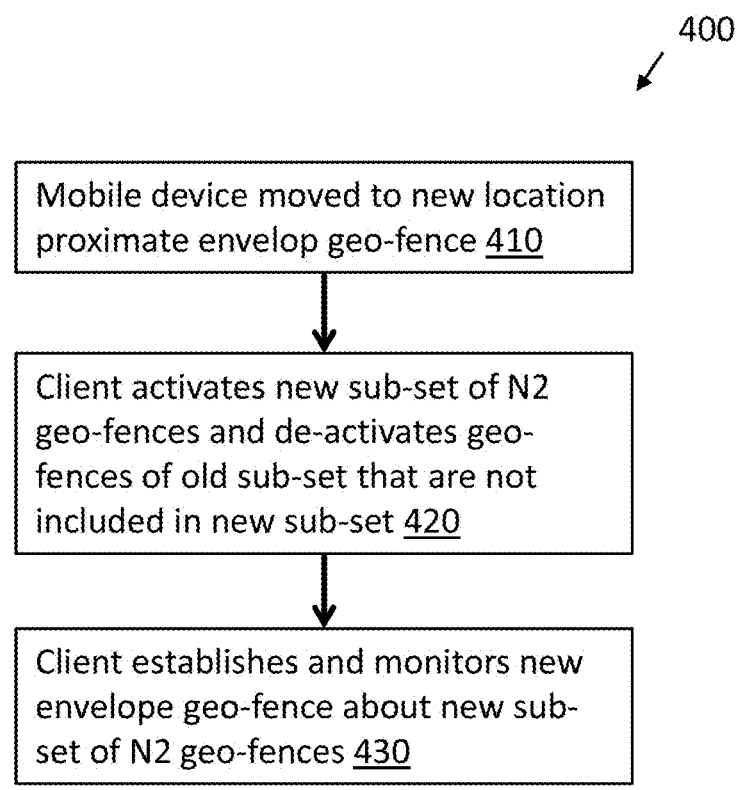
FIG. 4 is a flow diagram of an example sequence of steps for updating active geo-fences when a mobile device is moved to a new location.
Figure 5:
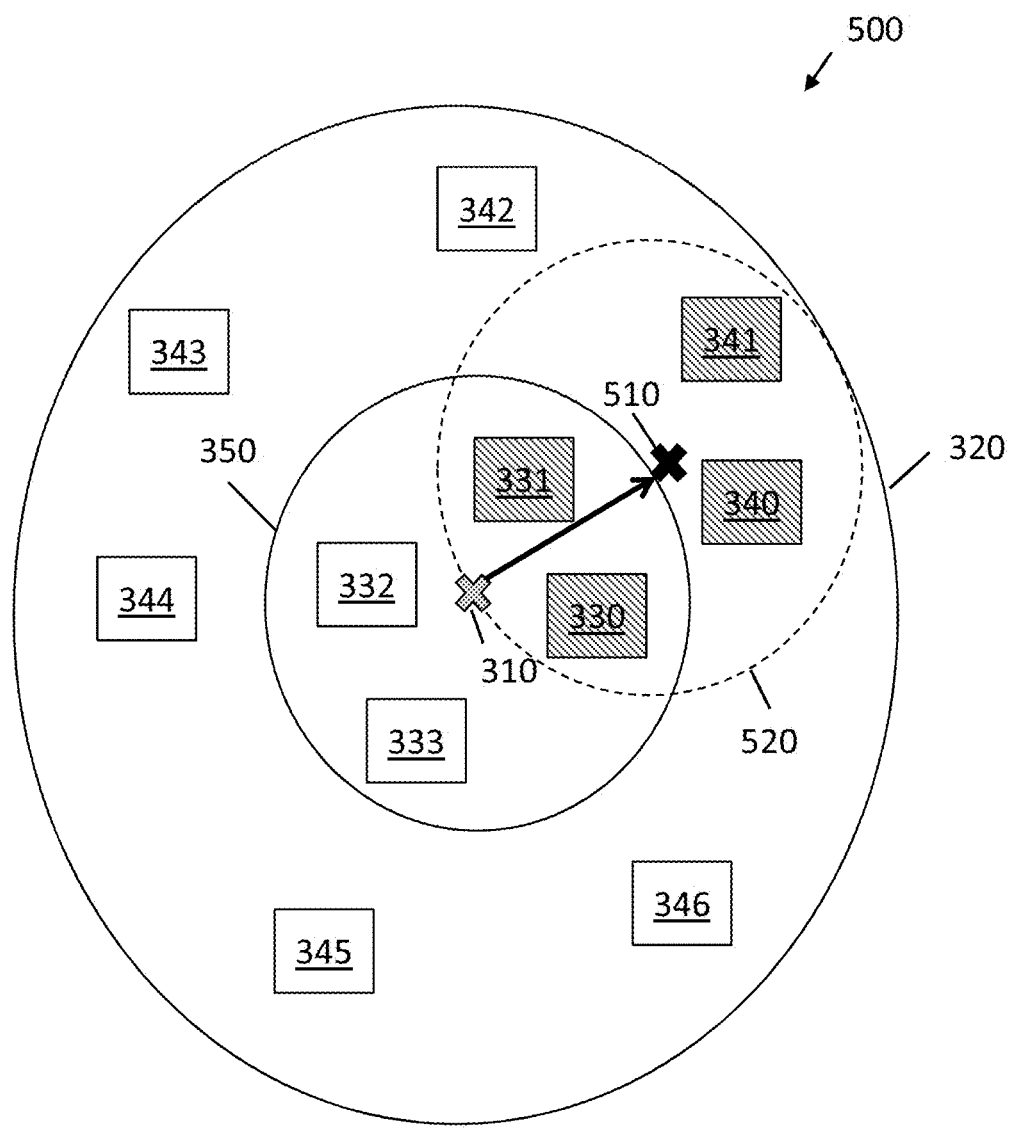
FIG. 5 is an example arrangement of geo-fences illustrating quantities discussed in FIG. 4.
Figure 6:
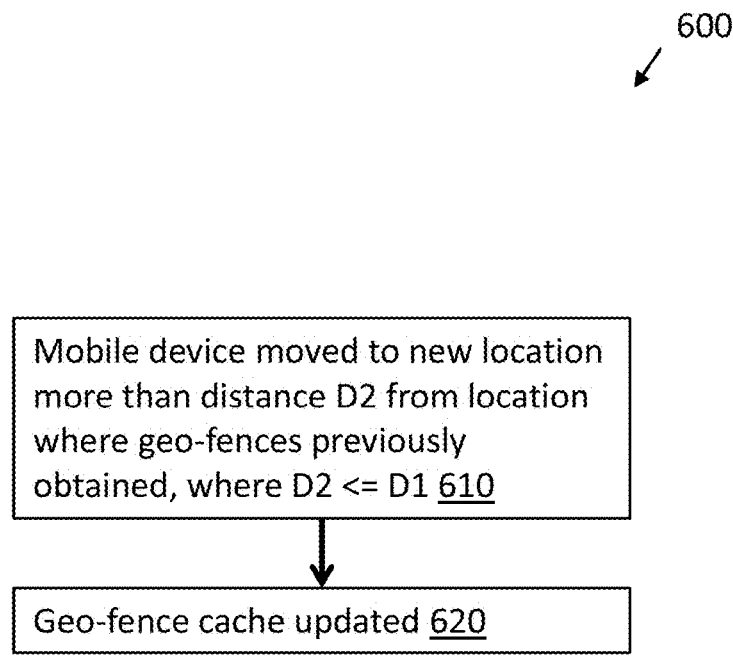
FIG. 6 is a flow diagram of an example sequence of steps for refreshing a geo-fence cache on a mobile device.
Figure 7:
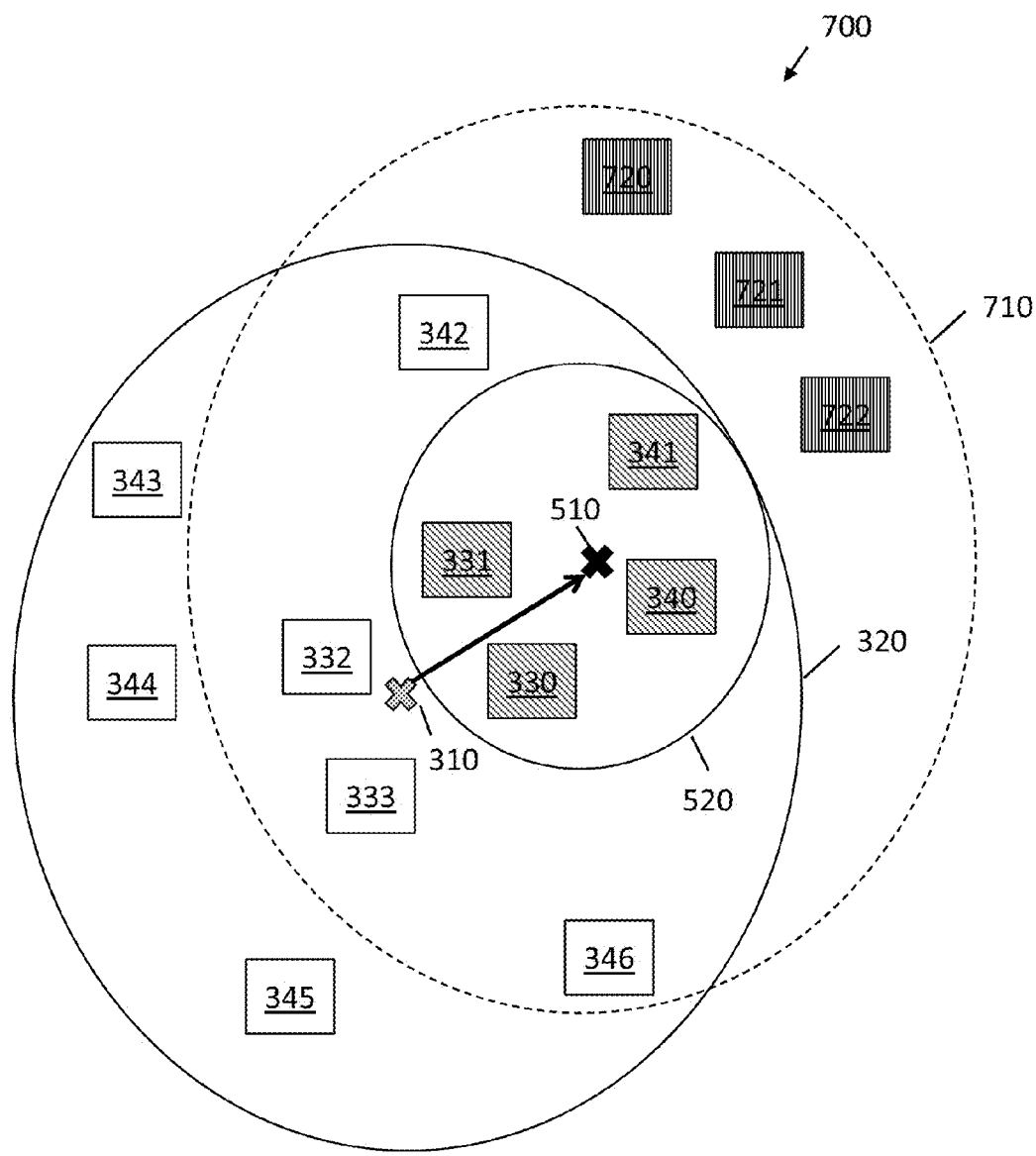
FIG. 7 is an example arrangement of geo-fences illustrating quantities discussed in FIG. 6.

FIG. 4 is a flow diagram of an example sequence of steps 400 for updating active geo-fences when the mobile device is moved to a new location. FIG. 4 may be better understood by reference also to FIG. 5, which is an example arrangement of geo-fences 500 illustrating quantities discussed in FIG. 4. At step 410, the mobile device 110 is moved to new location proximate the envelope geo-fence (e.g., has crossed the envelope geo-fence). For example, as shown in FIG. 5, the mobile device may be moved from location 310 to location 510 which is outside of the envelope geo-fence 350. At step 420, the client activates a new sub-set of N2 geo-fences based on proximity to the new location 510 and de-activate geo-fences of the old sub-set of N2 geo-fences that are not included in the new sub-set of N2 geo-fences. The new sub-set of N2 geo-fences may include new geo-fences as well as some geo-fences that were previously included in the old sub-set of N2 geo-fences. The client may de-activate geo-fences of the old sub-set of N2 geo-fences that are not included in the new sub-set of N2 geo-fences. At step 430, the client 145 establishes and monitors a new envelope geo-fence about the new sub-set of N2 geo-fences, and de-activates the old envelope geo-fence. For example, as shown in FIG. 5, new envelope geo-fence 520 may be activated, while old envelope geo-fence 310 may be de-activated. The sequence of steps 400 may be repeated as the mobile device moves about and crosses successive envelope geo-fences FIG. 6 is a flow diagram of an example sequence of steps 600 for refreshing the geo-fence cache 150 on the mobile device 110. FIG. 6 may be better understood by reference also to FIG. 7, which is an example arrangement of geo-fences 700 illustrating quantities discussed in FIG. 6. At step 610, it is detected that the mobile device has moved to a new location more than a distance D2 from the location where geo-fences were previously obtained, where D2 is a number less than D1 (i.e. D2<D1). For example, as shown in FIG. 7, the mobile device may be moved to a new location 510 that is more than a distance D2 from the original location 310. In one implementation, the value of D2 is a function of D1. The function may try to balance between frequency of access to the server 120 and the likelihood that the mobile device 110 may move beyond those geo-fences that are cached before additional geo-fences can be obtained from the server 120.

At step 620, the geo-fence cache is updated to ensure there is a set of N1 geo-fences. The new set of N1 geo-fences may include some geo-fences already in the geo-fence cache, as well as new geo-fences obtained from the server. Obtaining the new geo-fences may be performed using operations similar to as discussed above in relation to FIG. 2. When new geo-fences are added the geo-fence cache 150 on the mobile device 110 they may potentially displace existing geo-fences in the cache that are not a part of the new set of N1 geo-fences. For example, as shown in FIG. 7, new geo-fences 720-722 may be added to the geo-fence cache as they are within distance D1 of new location 510. Other geo-fences 343, 344, 345 previously in the geo-fence cache may be displaced as they are not a part of the new set of N1 geo-fences. The sequence of steps 600 may be repeated as the mobile device moves about and the geo-fence cache needs to be refreshed.

Figure 8:
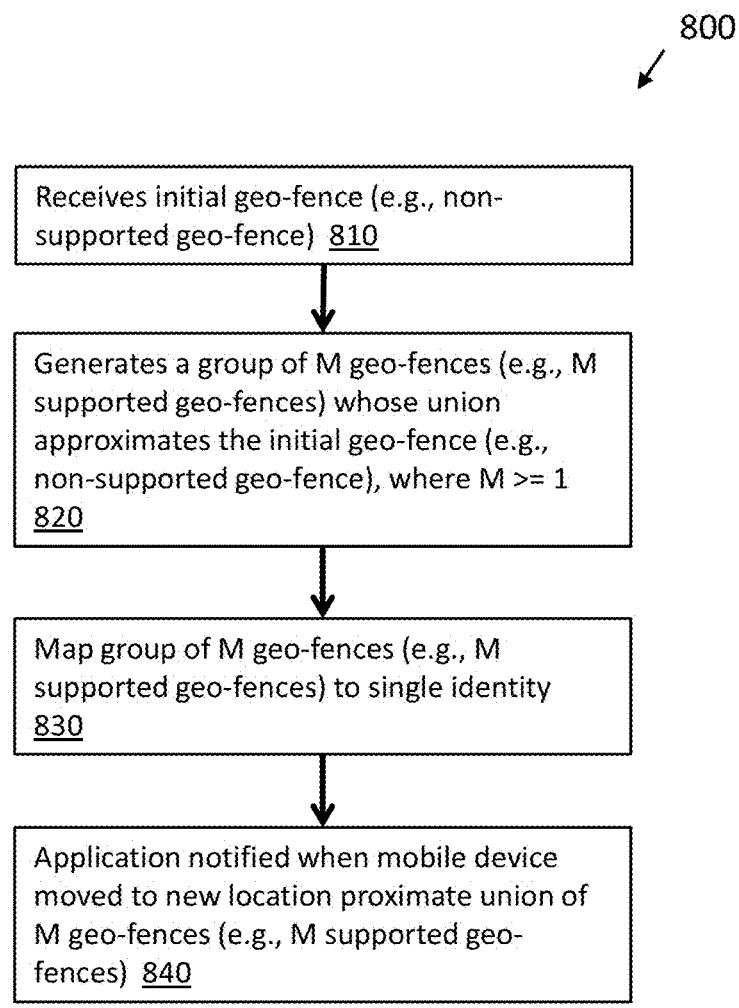
FIG. 8 is a flow diagram of an example sequence of steps for approximating use of geo-fences of various shapes and/or sizes.
Figure 9:
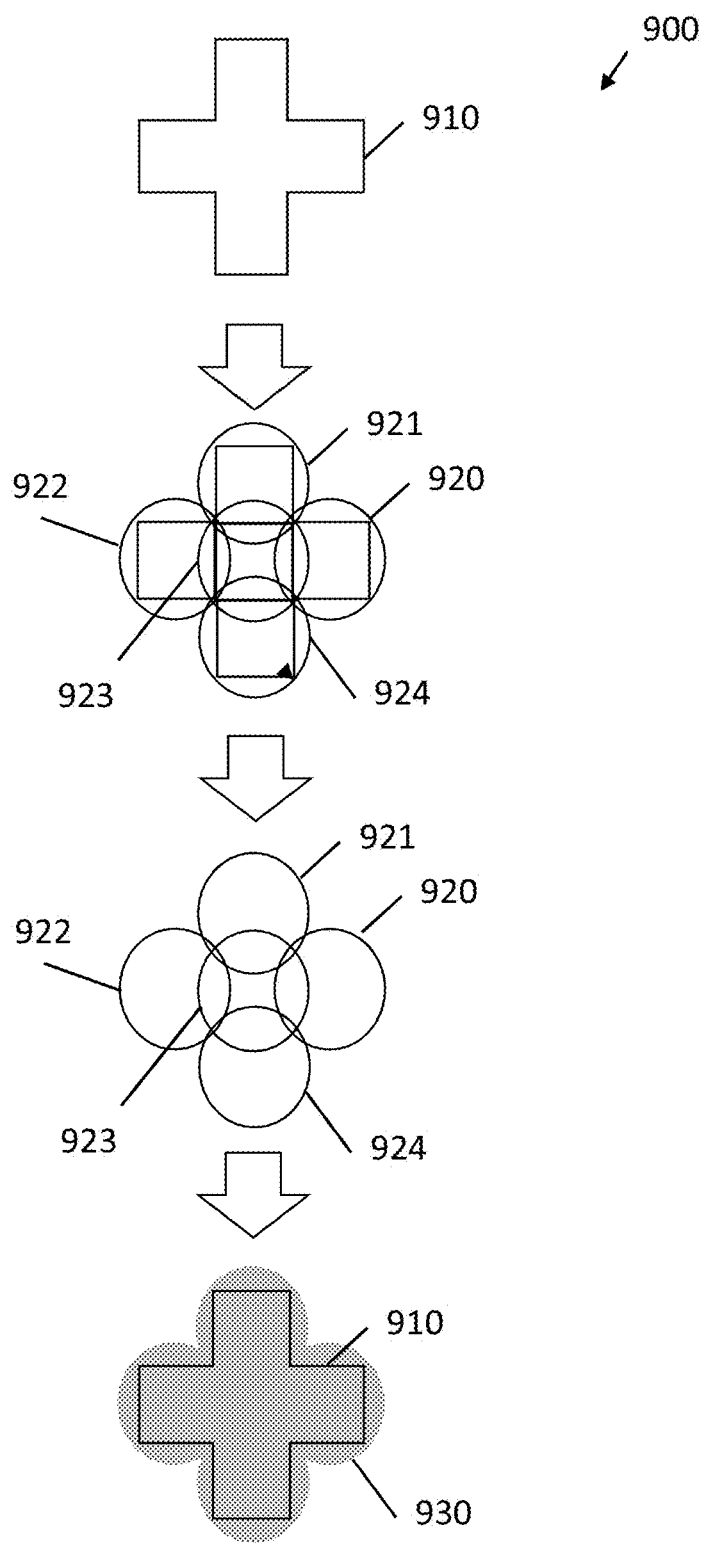
FIG. 9 is an illustration of an initial geo-fence being approximated with a group of other geo-fences.

In another example embodiment, the client on the mobile device approximates use of geo-fences of various shapes and/or sizes, potentially including shapes and/or sizes other than those natively support by the mobile device 110. FIG. 8 is a flow diagram of an example sequence of steps 800 for approximating use of geo-fences of various shapes and/or sizes. FIG. 8 may be better understood by reference also to FIG. 9, which is an illustration 900 of an initial geo-fence being approximated by a group of other geo-fences. At step 810, the approximation process 195 (included in the client 145 or resident on the server 120) receives an initial geo-fence having a given shape and/or size. The given shape and/or size may be one that is not natively support by the mobile device 110, such that the initial geo-fence is considered a "non-supported geo-fence". For example, as shown in FIG. 9, an initial geo-fence (e.g., non-supported geo-fence) 910 may have a cross-like shape (e.g., which may not be supported on a mobile device that only supports circular geo-fences). It should be understood that the initial geo-fence (e.g., non-supported geo-fence) may have any of a variety of other shapes, for example, an irregular user-defined shape, a multi polygonal shape, or other shape that software and/or hardware on the mobile device does not natively accept. Likewise, the initial geo-fence (e.g., non-supported geo-fence) may have any of a variety of sizes, including sizes larger than a mobile device will accept, sizes smaller than a mobile device will accept, or other sizes.

At step 820, the approximation process generates a group of M geo-fences whose union approximates the initial geo-fence (e.g., non-supported geo-fence), where M is a value greater than or equal to one (i.e. M>=1). The group of M geo-fences may be natively supported by the mobile device 110, such that the geo-fences are considered "supported geo-fences." For example, as shown in FIG. 9, five circular geo-fences (e.g., a group of five supported geo-fences) 920-924 may approximate the initial geo-fence (e.g., non-supported geo-fence) 910. The group of M geo-fences may be considered to "approximate" the initial geo-fence based on one or more standards. In one implementation, the M geo-fences may "approximate" the initial geo-fence by their union defining a minimum bounding shape that encloses the initial geo-fence. In another implementation, the M geo-fences may "approximate" the initial geo-fence by their union including a given percentage (e.g., 95%) of the initial geo-fence. A variety of other standards may also be employed.

At step 830, the group of M geo-fences (e.g., the group of M supported geo-fences) are mapped to a single identity. At step 840, whenever it is detected that mobile device 110 is moved to new location proximate to (e.g., has crossed) the union of the M geo-fences (e.g., M supported geo-fences), an application that utilizes the initial geo-fence (e.g., the non-supported geo-fence) is notified. For example, if the mobile device has crossed one of the M geo-fences, and has not crossed into another of the M geo-fences, but has instead left the union of the M geo-fences, an application that utilizes the initial geo-fence (e.g. the non-supported geo-fence) may be notified. In this manner, the union of the group of M geo-fences (e.g., the group of M supported geo-fences) is effectively treated as an equivalent and the initial geo-fence (e.g., non-supported geo-fence). For example, in reference to FIG. 9, the group of five geo-fences 920-924 whose union is 930 is treated as an equivalent of initial geo-fence 910, and an application using initial geo-fence 910 is notified when the union 930 is triggered. The sequence of steps 800 may be repeated for each initial geo-fence (e.g., non-supported geo-fence) that is to be utilized in connection with the mobile device 110.

In summary, the above described techniques may be used to approximate concurrent monitoring of a large number of geo-fences, potentially beyond a number supported by a mobile device, and to approximate use of geo-fences of various shapes and/or sizes, potentially other than those natively support by the mobile device. It should be understood that the techniques, and portions, thereof may be utilized together, individually, or in combination with other techniques, depending on the implementation. Further, it should be understood that aspects of the techniques may be modified, added to, removed, or otherwise changed depending on the implementation.

For example, while some of the examples discussed above involve two-dimension (2-D) geo-fences, it should be understood that the techniques are readily applicable to three-dimensional (3-D) geo-fences. For instance, rather than circles, polygons, and the like, the geo-fences may be arranged as spheres, prisms and similar 3-D shapes.

Further, while certain processes 160, 170 190, 195 discussed above, are described as resident on the mobile device 110 and/or the server 120, it should be understood that the processes, and portions thereof, may be otherwise located, such that operations may be performed on different devices. For instance, at least portions of the activation process 170 may performed on the server 120 rather than on the mobile device 110. Likewise, an additional server (not shown) or other electronic device may be called upon to perform some operations.

In general, while specific example hardware and software is discussed above, it should be understood that the technique may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory computer-readable medium, such as a volatile or persistent memory device, a hard-disk, or other data store. Combinations of software and hardware may be adapted to suit different environments and applications.

Accordingly, it should be understood that the above descriptions are meant to be taken only by way of example.

What is claimed is:

1. A method comprising:
receiving a non-supported geo-fence having a shape or size that is not natively supported on a mobile device;
generating a group of one or more supported geo-fences whose union approximates the non-supported geo-fence;
mapping the group of one or more supported geo-fences to a single identity; and
monitoring, by the mobile device, the one or more supported geo-fences of the group of one or more supported geo-fences to determine when the non-supported geo-fence has been triggered.

2. The method of claim 1, wherein the monitoring further comprising:
detecting the mobile device has crossed one of the one or more supported geo-fences of the group of one or more supported geo-fences, and has not crossed into another supported geo-fence of the group of one or more supported geo-fences; and
in response to the detecting, notifying an application that utilizes the non-supported geo-fence that the non-supported geo-fence has been triggered.

3. The method of claim 1, wherein a shape of the one or more supported geo-fences differs from the shape of the non-supported geo-fence.

4. The method of claim 1, wherein the group of one or more supported geo-fences includes multiple supported geo-fences.

5. The method of claim 1, wherein the union of the one or more supported geo-fences is considered to approximate the non-supported geo-fence by the union defining a minimum bounding shape that encloses the non-supported geo-fence.

6. The method of claim 1, wherein the union of the one or more supported geo-fences is considered to approximate the non-supported geo-fence by the union including at least a given percentage of area enclosed by the non-supported geo-fence.

7. The method of claim 1, wherein the shape or size that is not natively supported on the mobile device is a shape that is not natively supported on the mobile device.

8. The method of claim 7, wherein the shape that is not natively supported on the mobile device is an irregular user-defined shape.

9. The method of claim 1, wherein the shape or size that is not natively supported on the mobile device is a size that is not natively supported on the mobile device.

10. The method of claim 9, wherein the size that is not natively supported on the mobile device is a size larger than the mobile device supports.

11. The method of claim 9, wherein the size that is not natively supported on the mobile device is a size smaller than the mobile device supports.

12. A non-transitory computer readable medium having executable instruction stored thereon, the executable instructions when executed by one or more processors of one or more mobile devices operable to:
receive an initial geo-fence having a first shape or size;
generate a group of geo-fences whose union encompasses the initial geo-fence, the group of geo-fences including one or more geo-fences having at least a second shape or size, the second shape or size being different than the first shape or size of the initial geo-fence;
mapping the group of geo-fences to a single identity; and
monitoring, by the mobile device, the geo-fences of the group of geo-fences to determine when the initial geo-fence has been triggered.

13. The non-transitory computer readable medium of claim 12, wherein the monitoring further comprises:
detecting the mobile device has crossed one of the geo-fences of the group of geo-fences, and has not crossed into another geo-fence of the group of geo-fences; and
in response to the detecting, notifying an application that utilizes the initial geo-fence that the initial geo-fence has been triggered.

14. The non-transitory computer readable medium of claim 12, wherein the union of the geo-fences of the group of geo-fences encompasses the initial geo-fence by the union defining a minimum bounding shape that encloses the initial geo-fence.

15. The non-transitory computer readable medium of claim 12, wherein the different shape or size is a different shape.

16. The non-transitory computer readable medium of claim 12, wherein the different shape or size is a different size.

17. The non-transitory computer readable medium of claim 16, wherein the first shape or size is a shape or size that the mobile device does not support, and the shape or size is a shape or size that the mobile device supports.

18. An apparatus comprising:
a processor configured to execute instructions; and
a memory configured to store executable instructions for a client application, the client application to include:
an approximation process configured to a obtain a non-supported geo-fence having a shape or size that is not natively supported on a mobile device and to generate a group of supported geo-fences whose union approximates the non-supported geo-fence, and
a geo-fence cache configured to store the group of supported geo-fences as active geo-fences,
wherein the approximation process is further configured to monitor supported geo-fences of the group of supported geo-fences to determine when the non-supported geo-fence has been triggered.

19. The apparatus of claim 18, wherein the approximation process is configured to monitor the supported geo-fences of the group of supported geo-fences by detecting when the mobile device has crossed one of the supported geo-fences of the group of supported geo-fences, and has not crossed into another supported geo-fence of the group of supported geo-fences, and, is configured to notify an application that utilizes the non-supported geo-fence that the non-supported geo-fence has been triggered.

20. The apparatus of claim 18, wherein the supported geo-fences have at least a different shape or size than the non-supported geo-fence.

21. The apparatus of claim 18, wherein the union of the supported geo-fences of the group of supported geo-fences approximates the non-supported geo-fence by the union defining a minimum bounding shape that encloses the non-supported geo-fence.

\* \* \* \* \*